United States Patent [19]

Heimlich

[11] Patent Number: 4,579,256

[45] Date of Patent: Apr. 1, 1986

[54] FLOWABLE MATERIAL DISPENSER

[76] Inventor: Philip F. Heimlich, 141 Rosemary La., South Windsor, Conn. 06074

[21] Appl. No.: 668,735

[22] Filed: Nov. 6, 1984

[51] Int. Cl.⁴ .......................................... B67D 5/64
[52] U.S. Cl. .................................... 222/162; 222/166
[58] Field of Search .................. 222/162, 163, 168.5, 222/166, 308, 160, 164, 438, 440, 454; 221/186

[56] References Cited

U.S. PATENT DOCUMENTS 502,596   8/1893   Suddoth .
2,036,906 4/1936   Winters .
3,347,425 10/1967  Beushausen et al. .
4,151,933 5/1979   Myers .
4,174,058 11/1979  Bassignani .

Primary Examiner—Stanley H. Tollberg
Attorney, Agent, or Firm—Hayes & Reinsmith

[57] ABSTRACT

A hand held and operated apparatus is provided for adjustably measuring and dispensing a flowable material. A vessel for containing the flowable material is positioned on a housing for movement between a first measuring position and second discharge position. An adjustable member is rotatably positioned with the housing and opposite the vessel for variably adjusting the quantity of material to be dispensed.

14 Claims, 8 Drawing Figures

FLOWABLE MATERIAL DISPENSER

FIELD OF THE INVENTION

This invention relates to devices for containing, measuring and dispensing flowable materials; more particularly, the invention relates to hand held and operable devices which are provided with means for varying the quantity dispensed.

BACKGROUND OF THE INVENTION

Metering devices which provide for the variable dispensing of flowable materials are known in the prior art. One type of such a device comprises a container which houses a measuring and dispensing mechanism which includes an adjustable volume measuring compartment and rotatable parts for measuring and dispensing, as illustrated in U.S. Pat. No. 4,174,058 issued to A. L. Bassignani. Other disclosures utilizing hand held and operable devices to dispense a predetermined quantity of a flowable material are shown in U.S. Pat. No. 502,596 issued to A. K. Suddoth and U.S. Pat. No. 889,738 issued to A. R. Weber. Furthermore, dispensing devices have also utilized a metering piston assembly to ensure a uniform material discharge as described in E. D. Myers U.S. Pat. No. 4,151,933.

SUMMARY OF THE INVENTION

A hand held and operated apparatus for measuring and dispensing flowable material includes a housing having a measuring chamber with an adjustably positioned piston for variably measuring discrete quantities of a flowable material. A vessel having a reservoir for containing the flowable material is positioned on the housing for movement by one-hand action. The reservoir communicates with measuring chamber through two passageways, a first passageway enabling a quantity of the material to fill the measuring chamber when the vessel is in a first non-discharging measuring position, and a second discharging passageway enabling the measured quantity of material to discharge from the measuring chamber when vessel is in the second position and the apparatus is inverted. The movement of the vessel between the two positions effectively seals the reservoir from undesired discharge of the flowable material.

OBJECTS OF THE INVENTION

A principal object of the invention is to provide an improved device for measuring and dispensing flowable material which is economical to fabricate, easily operated and adaptable to a wide variety of uses.

Another object of the invention is to provide an improved measuring and dispensing device which is easily assembled by hand or machine and formed from a minimum number of parts to establish a low cost container and adjustable dispenser which can be disposed of when the flowable material has been exhausted.

A further object of the invention is to provide an improved device forming a one-piece, integral, environmentally sealed and non-disassembleable apparatus which provides for the protection of a flowable material, the device further of such shape, size and arrangement that a minimum of human effort is required to operate and handle.

Still another object of the invention is to provide an apparatus which permits the dispensing of an adjustable quantity of flowable material through facile one-handed operation during which the preferred sequence of operation entails placing the device in a fill position to load the measuring chamber, sliding the vessel over the housing therein disengaging the reservoir from the measuring chamber to effectively seal the reservoir from undesired delivery of flowable material and inverting the apparatus to discharge the flowable material.

Another object of the invention is to provide an apparatus wherein any undesired dispensing of the flowable material is eliminated by positive closure of the reservoir from the measuring chamber.

Other objects will be in part obvious and in part pointed out in more detail hereinafter.

A better understanding of the objects, advantages, features, properties and relations of the invention will be obtained from the following detailed description and accompanying drawings which set forth a certain illustrative embodiment and is indicative of the various ways in which the principles of the invention are employed.

DESCRIPTION OF THE PREFERRED EMBODIMENT

Figure 1:
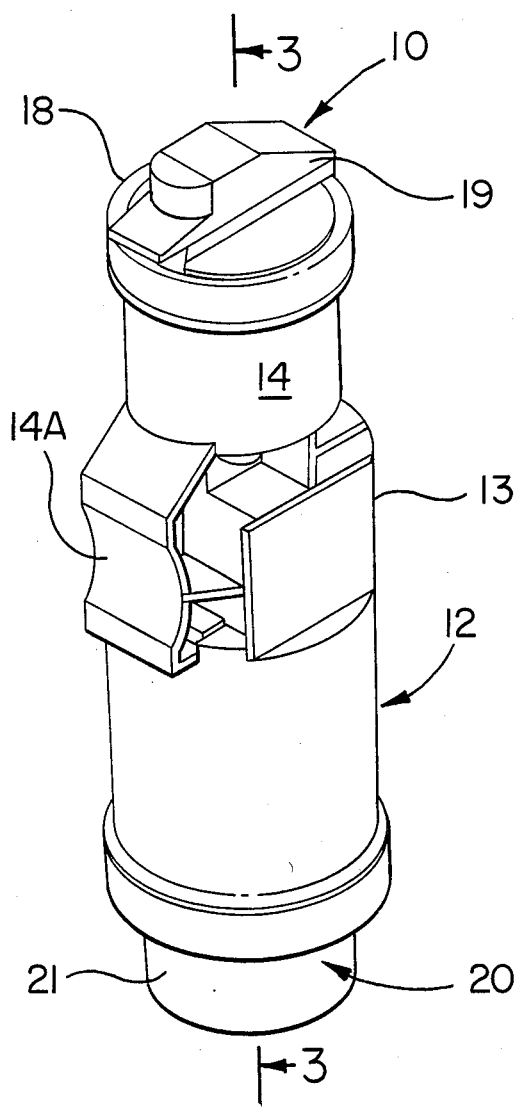
FIG. 1 is a perspective view of a preferred embodiment of this invention in first, non-discharging, measuring position.
Figure 2:
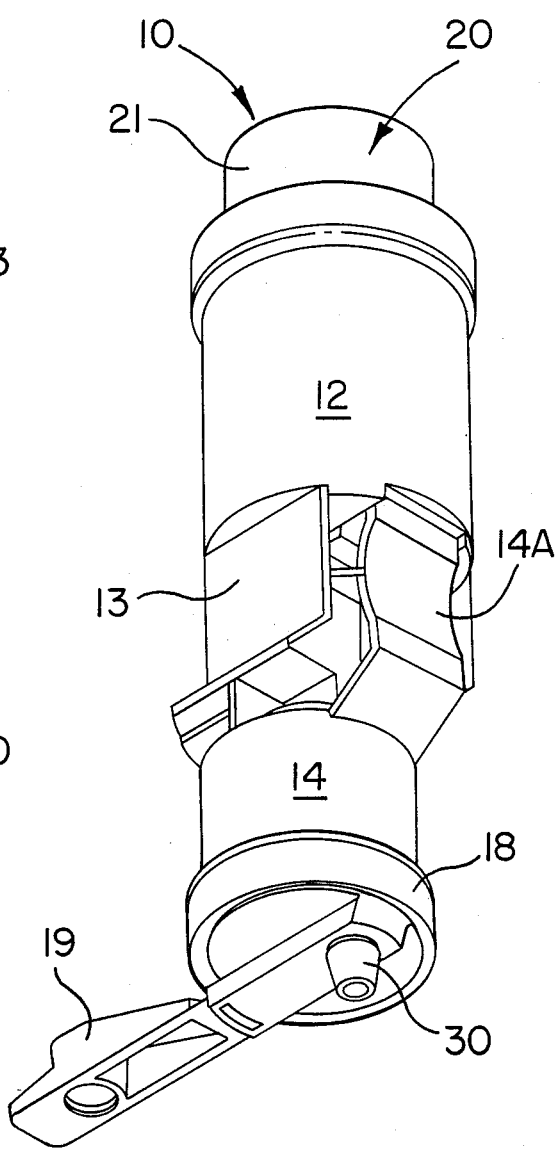
FIG. 2 is a perspective view of the invention of FIG. 1 in second, discharging position.

Directional terms are used herein, but it is to be understood that such terminology is employed for convenience of description and is not to be regarded in any way as limiting the invention.

Referring to the drawings in greater detail wherein like reference numerals indicate like parts within the figures, a preferred embodiment of the device 10 is comprised of a minimum number of parts assembled into an integrated unit of a size to be readily grasped and held in one hand. The parts are preferably of plastic material to afford light weight and economical construction.

As seen in FIG. 1, where apparatus is in the upright or measuring position, device 10 is provided with a chamber or vessel 14 connected to housing 12. It is to be noted that the device can be modified to enable attachment of any conventional removable recepticle, such as a medicine jar, bottle, etc., to the upper end of housing 12. One end of an adjustable member 20 is positioned within housing 12 opposite vessel 14 providing means such as a metering member for varying the quantity of material to be measured and dispensed. A grippable knob portion 21 of member 20 extends outward from housing 12 to allow movement of adjustment member 20 within housing 12.

Figure 3:
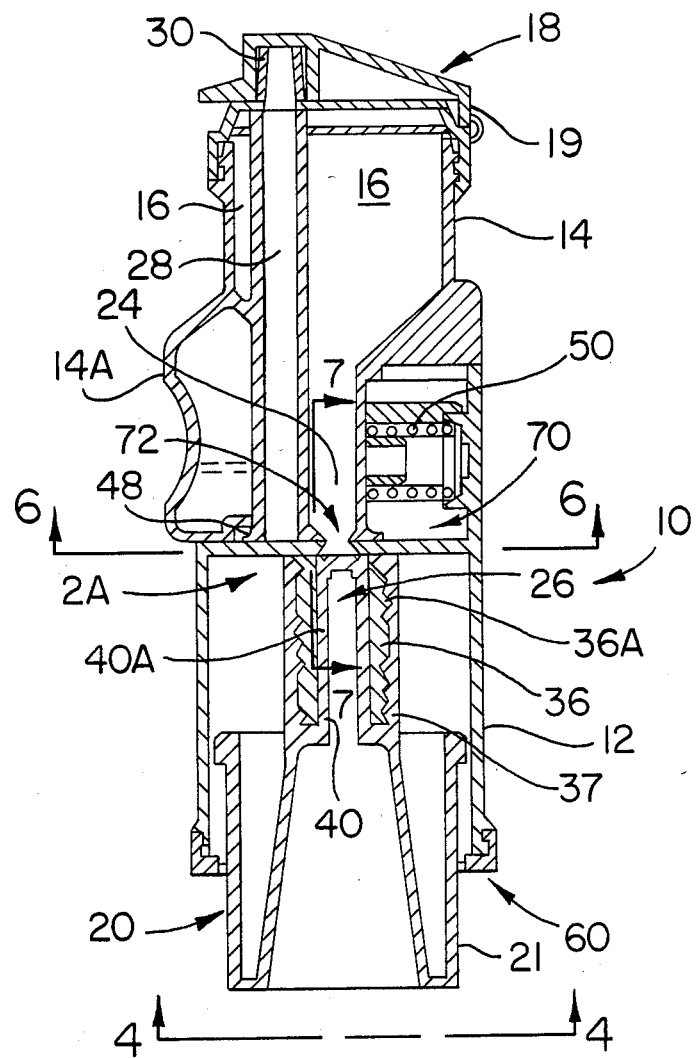
FIG. 3 is a cross section of the invention taken along line 3—3 of FIG. 1 illustrating the device in the first nondischarging measuring position.

In the preferred embodiment, a cylindrical vessel 14 is slidably interconnected to upper portions of housing 12. Vessel 14 is positioned on housing 12 to allow sliding movement thereof but also is secured to vessel 12 in a tight, sealing relation and is preferably made of clear or translucent plastic material to enable an operator to visually perceive the product level contained therein. As seen in FIG. 3 exterior walls of vessel 14 form a curved portion 14A to allow movement by finger or thumb. The interior of vessel 14 forms a reservoir 16 to contain the flowable material to be dispensed. Reservoir 16 terminates in a fill or first passageway 24 and extends axially from lower end of reservoir 16 to central interface portion 70 of vessel 14 and housing 12. A discharge or second passageway 28 extends through vessel 14, having a first or upper end defining a tapered spout 30, and a second or lower end, radially spaced from and coplanar with end of first passageway 24. Interior walls of vessel 14 form an oval ring seal 48 (FIGS. 3 and 6) around first passageway 24 and second passageway 28 and seals vessel 14 against housing 12.

For containing material within device 10 and providing an environmental seal to protect the flowable material from contaminants the separate elements of the device are assembled into an integrated unit. To contain a flowable material within vessel 14 before dispensing a closure member or a cover 18 of plastic is mounted or hinged on the neck-like portion of vessel 14 and secured by mating flange portion of cover 18 engageable with an outwardly flanged portion of vessel 14 (FIG. 3). Cover 18 contains a pivotable member 19 integrally formed with or secured thereto, such as by a hinge, which forms a cap of a diameter to fit over and tightly seal spout 30. Moreover, at the opposite end of vessel 14, the oval ring seal 48 seals vessel 14 against housing 12 to ensure an environmentally secure reservoir or compartment for containing flowable material until it is disposed.

Communicating with vessel 14 is a generally cylindrical housing 12. Housing 12 forms a central smooth bore measuring chamber 26, preferably cylindrical, for measuring the material to be dispensed. As best illustrated in FIG. 3, outer surface of extension 36 of housing 12 forms a multiple pitch thread assembly 36A whose inner surface forms the smooth walls of measuring chamber 26. Outer surface 36 forms a conventional differential thread which communicates with a sleeve 37 formed by adjustment member 20 to ensure accurate disposition of a metering member or piston 40. In the preferred embodiment, the multiple pitch thread assembly 36A is a quad thread with one thread removed to provide the proper angular alignment with sleeve 37.

Figure 5:
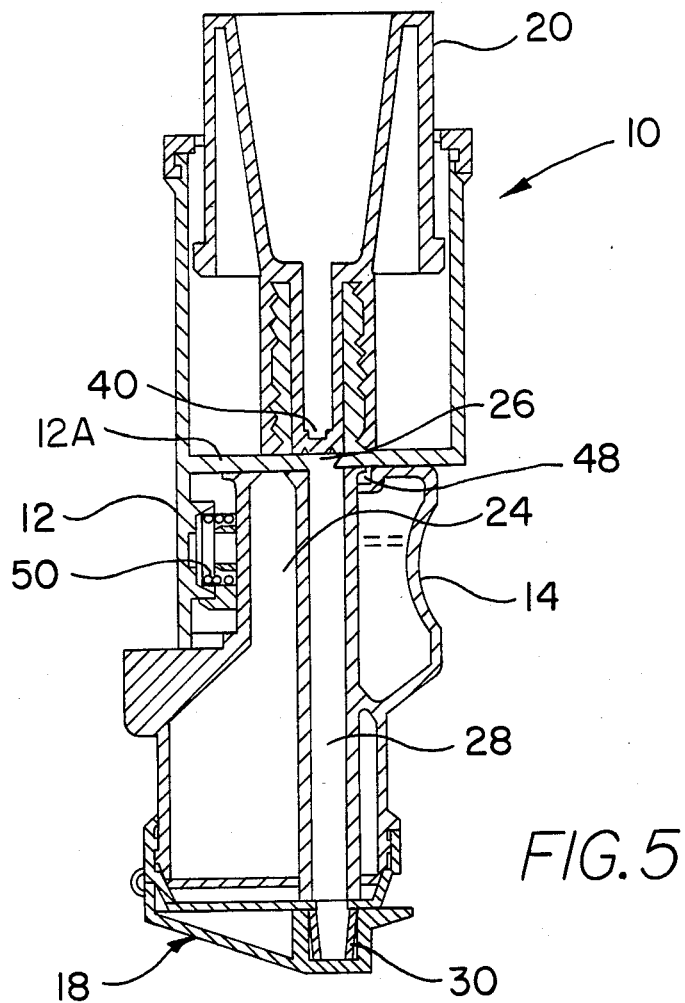
FIG. 5 is a cross section of the invention illustrating the device in the second discharging position.
Figure 6:
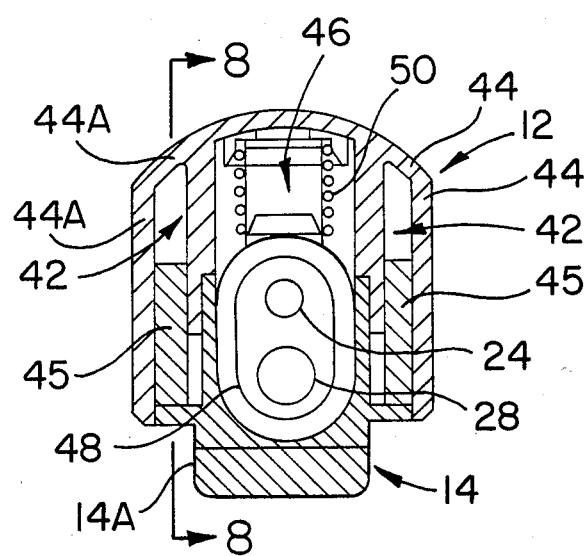
FIG. 6 is a cross section taken along line 6—6 of FIG. 3.

Housing 12 contains a compression spring 50 for controlling the sliding movement of vessel 14 between first measuring positon (as shown in FIG. 3) and second discharging position (as shown in FIG. 5). As best shown in FIG. 6, compression spring 50 is located between opposed pair of side members 44 and 44A of housing 12. Parallel spaced projections or side members 44 and 44A extend radially from outer wall of housing 12 to form guideways or tracks 42 within which an opposing pair of projections or side members 45 of vessel 14 slide. Not shown are conventional stops formed along interacting sections of housing 12 and 14 for restricting undesired lateral and axial movement. End portions of member 45 of vessel 14 form snap over lips which engage a section of members 44 and 44A of housing 12 to prevent disengagement thereof. Thus, when vessel 14 is moved relative to housing 12, the snap over portions restrict the undesired rotational, radial or axial movement of vessel 14 relative to housing 12. Inner side members 44 and 44A and outer wall of housing 12 form a cavity 46 for retaining compression spring 50 against which vessel 14 moves when forced into second or discharging position. Compression spring 50 preloads vessel 14 relative to housing 12 to maintain vessel 14 in its first or fill position allowing material to flow from reservoir 16 into measuring chamber 26.

To ensure against the undesired discharge of flowable material, the construction of device 10 is such that as vessel 14 is moved from first to second position, reservoir 16 is disengaged from measuring chamber 26 thereby sealing the first fill passageway 24 against interior wall 12A of housing 12. Moreover, a pair of detents 86 are provided in a different embodiment of the device along the longitudinal interior walls of vessel 14 to secure vessel 14 in second dispensing position thereby ensuring that the desired amount of material is dispensed. Description of the detents 86 follows.

Figure 8:
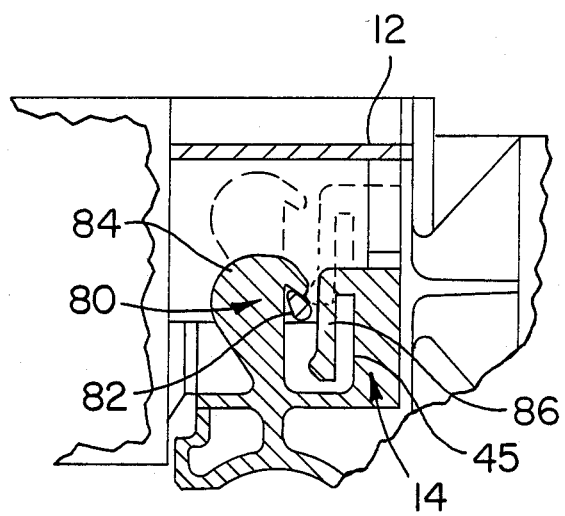
FIG. 8 is an enlarged perspective view along line 8—8 of the device in FIG. 6 illustrating the positions of the housing and vessel relative to one another in the measuring position (solid lines), and dispensing position (broken lines).

First describing the interconnection of vessel 14 and housing 12, as seen in FIG. 8 (solid lines), interior side walls 45 of vessel 14 form a snap over or raised indented portion portion 80 on opposite sides of vessel along the longitudinal axis of the device. Vessel 14 is positioned on housing 12 and secured thereon by the communication of the pair of raised indented portions 80 engagable with a wedge or flanged portion 82 of housing 12. Hook tip 84 of raised indented portion slides over flanged portion 82 and secures vessel 14 to housing 12 thereby preventing the disengagement of vessel 14. The solid lines indicate the relative positions of vessel 14 and housing 12 when device 10 is in the first, measuring position.

To avoid any inadvertant or premature discharge due to an undesired release of vessel from second, dispensing position and ensure that the exact premeasured amount of material is dispensed, a pair of detents 86 are formed in the longitudinal interior walls of vessel 14 to secure vessel 14 in the dispensing position (dashed lines). Once vessel 14 is moved into second position, wedge 82 of housing 12 holds detent 86 of vessel in the dispense position until force is exterted by the operator to release detent 86 from locked position relative to wedge 82.

Figure 7:
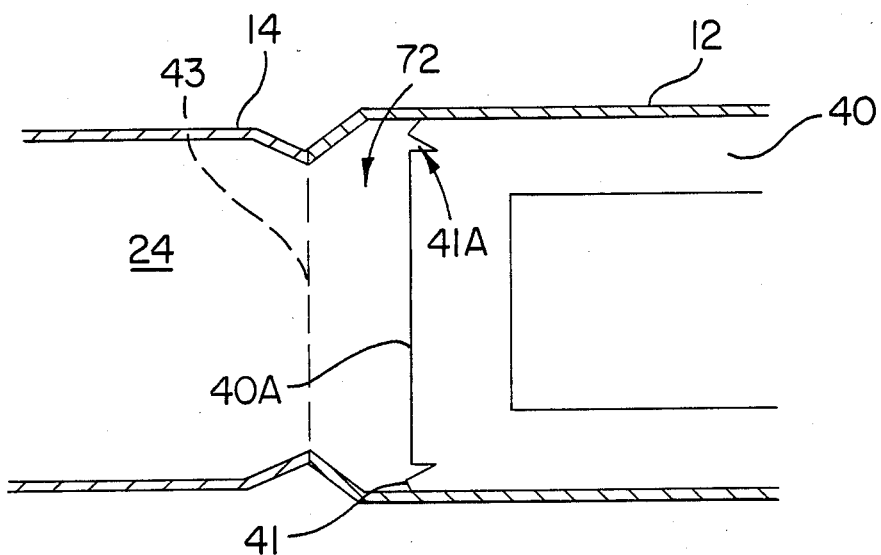
FIG. 7 is a sectional view taken along line 7—7 of FIG. 3.

Adjustable member 20 is specifically designed for controlling the amount of material filled into and dispensed from measuring cylinder 26. While piston 40 may have an outer diameter equal to the inner diameter of measuring chamber 26, it is preferred that top portion 40A of the piston 40 have a greater diameter than measuring chamber 26. Referring to FIGS. 3 and 7, adjustable member 20 forms hollow reentrant piston 40 with first end 40A of reentrant piston being tapered and having a first end 40A of slightly larger diameter than measuring chamber 26. First end 40A of piston 40 has a thin outer annular lip portion 41 that is separated from the main inner portion of piston 40 by annular chamber 41A. Lip portion 41 allows for greater dimensional tolerances for the threaded portions of housing 12 and adjustment member 20 while maintaining sealing integrity with measuring chamber 26. The inherent resiliency of the piston member material allows for lip portion 41 to be compressed by internal surfaces of chamber 26 as it is adjustabley positioned within chamber 26, thus sealing measuring chamber 26, as it is rotated therein by adjustment of knob 21 to control the exact volume of flowable material to be dispensed.

A tapered cavity or minimum charge chamber 72 for containing a minimum volume of material is defined in housing 12 between first end of piston 40A and vessel 14. When piston 40 is fully inserted in measuring chamber 26 (as seen in FIG. 7), minimum volume cavity 72 allows for an accurate minimum volume to be measured. The shape of cavity 72 allows for linear dispensing of flowable material.

Figure 4:
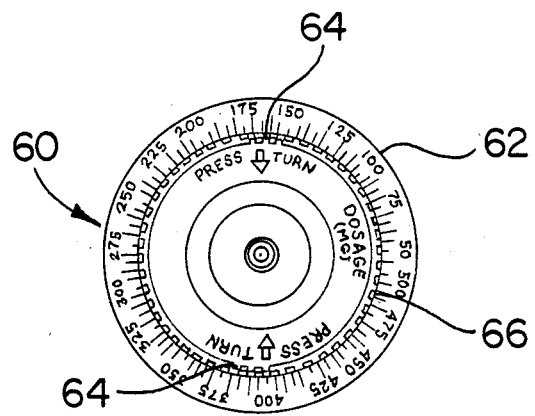
FIG. 4 is an end view taken along line 4—4 of FIG. 3.

The outside surface of housing 12 at snap over means 60 and end portion of adjustment member 20 are provided with interrelating graduated indicia, such as micrometer indicia 62 or dosage level decal to indicate the degree to which piston extends into measuring chamber 26. As seen in FIG. 4, a suitable grade scale having a pointer is used to indicate the respective adjusted capacity of the measuring chamber corresponding to different rotated positions of adjustment member.

Adjustable member 20 is moved and held between minimum and maximum volume settings by the interaction of axial grooves formed in adjustable member 20 and housing 12 (FIG. 4). Two series of three parallel axial grooves 64 are formed in opposite sides of outer surface of adjustable member 20. Axial grooves 64 are engageable with a plurality of corresponding detents 66 which are continuously formed in inner surface of connection portion 60 of housing 12. To rotatably adjust member 20, member 20 is grasped and squeezed (by inherent flexibility of plastic materials) at 21 to release the interlocking teeth 64 and 66 and rotated with reference to scale to the desired setting and capacity of measuring chamber. Release of member 20 interlocks detents and secures member 20 in position. Such movement of adjustable member 20 moves piston 40 within measuring chamber 26 and variably adjusts the volume therein.

The described construction uniquely provides not only a compact, protective and economical overall design, but also ensures optimum operation for the precise measurement and dispension of a flowable material. In operation, a desired setting for dispensing an equivalent amount of flowable material is set by adjusting knob 21 with reference to scale 62. The operator then rotates the device to the upright position, as seen in FIG. 1, with vessel 14 above adjustable member 20 to accurately pre-measure a specific quantity of material. As the apparatus is then in the first, fill position, the material contained in reservoir 16 flows through first passageway 24 into measuring chamber 26. The device is grasped in one hand about vessel 12 with fingers or thumb about the area of curved member 14A. To eliminate any need for multiple valves, gates or the like and for independently controlling the filling, measuring and dispensing operations while ensuring the dispensing of a precise quantity of a flowable material, the device of this invention features an arrangement whereby radial compression of a vessel 14 relative to housing 12 shifts the vessel 14 from the first, fill position to a second, discharge position (as shown in FIG. 5) and in doing so disengages reservoir 16 from measuring chamber 26. The operator squeezes his hand to slide vessel 14 against housing 12 so to force first passageway 24 out of register with chamber 26, and into the second, or discharge position, as best illustrated in FIG. 7. Vessel 14 moves along guideways 42 formed between vessel 14 and housing 12, against the action of the compression spring 50 to register second passageway 28 with chamber 26. Upon inversion of apparatus 10 the measured amount of material is discharged through second passageway 28 and out spout 30. Vessel 14 will remain in second position until force is released, whereupon the spring load returns vessel 14 to first position.

The spring mechanism 50 will prevent material measured into chamber 26 from being inadvertently dispensed should the vessel 14 be suddenly released from operator's hand before the completion of its full travel to the discharge position and will also ensure the precise volume of material remains intact within chamber 26. When force on the vessel 14 is released, spring 50 urges vessel 14 outward so as to seal off second passageway 28 from chamber 26 and place first passageway 24 in registry with chamber 26 allowing for another quantity of material to be measured or filled within chamber 26.

In the embodiment of the device wherein detents 86 are provided to lock vessel 14 in second disengaging position, force must be exerted on vessel 14 to overcome resistance of detents 86 and place vessel 14 in first measuring position.

Use of a spring means 50 or detents 86 for controlling the movement of the vessel is preferred but not essential. If these features are not provided, vessel 14 would have provisions for two way operation by thumb or finger, such as a knob projecting from its side to be readily grasp by thumb or finger. Similarly, while the preferred slidable operating mechanism is simple to make and assemble, other means for translating the motion imparted to the device by the user may be desired, such as rotary, axial or combination thereof. The motion can also take place in more than one plane by the use of gears, cams, screw threads and the like.

Exemplary of how the device can be modified to accommodate rotary operation of the device will now be described. First surface 12A of housing 12 is provided with grooves in which vessel 14 is adapted to rotate. The spring means are modified to control a rotational movement of vessel 14 enabling vessel to be rotated between fill and discharge positon with relation to measuring chamber. Specifically, the vessel may be pivotally mounted on housing 12 to deposit flowable materal within measuring chamber and alternately to disperse material therefrom. As such, vessel 14 would be rotated in a clockwise direction against the action of spring enabling the second passageway of vessel to be brought into registry with measuring chamber thereby allowing the desired amount of material to be dispersed through passageway when apparatus is inverted. When dispensing has been completed the force on vessel is released allowing the spring to rotate vessel into first position wherein first passageway reqisters measuring chamber. Detents, such as those at 86 may be modified to secure vessel in second dispensing position. Upon placing apparatus in upright position, a desired amount of material can be measured once again. An extended or operating stem finger portion may be placed on outside of vessel to provide an improved operating system.

When dispensing substances which require childproofing or tamperproofing, the device is particularly valuable because operation of the device require several independent movements before a dispense occurs, thus providing the necessary safeguards.

As will be apparent to persons skilled in the art, various modifications, adaptations and variations of the foregoing specific disclosure can be made without departing from the teachings of this invention.

I claim:

1. A hand held and operable device for measuring and dispensing a flowable material comprising:
   (a) a housing having a measuring chamber for accepting and measuring a quantity of said flowable material;
   (b) a vessel having a reservoir for containing said flowable material supported on said housing for movement between a first measuring position and second discharging position, said vessel communicating with said measuring chamber through two passageways, a first measuring passageway in axial alignment with said measuring chamber when said vessel is in said first measuring position allowing said flowable material to flow into said measuring chamber and a second dispensing passageway having one end spaced from and coplanar with said first measuring passageway movable into registry with said measuring chamber, said second dispensing passageway having an opposite end forming a discharge opening whereby movement of said vessel from first passageway registry with measuring chamber to second discharge passageway registry with measuring chamber, and upon inversion of said device, the material in said measuring chamber will flow through said second dispensing passageway delivering said flowable material.

2. The device of claim 1 wherein said measuring chamber contains a metering member which is adjustably positioned within said measuring chamber to vary the quantity of said flowable material receivable in said measuring chamber.

3. The device of claim 1 further comprising an adjustable member accessible from exterior of said housing rotatably positioned within said housing and being opposite said vessel, said adjustable member having a metering member movably disposed within said measuring chamber to vary the volume of said flowable material fillable into said measuring chamber.

4. The device of claim 3 further including a ring seal formed in said vessel around said first and second passageways and engaging said housing.

5. The device of claim 4 wherein said measuring chamber is of a cylindrical cross sectional configuration and said metering member is a piston for movement within said measuring chamber.

6. The device of claim 5 wherein said piston has an outer diameter equal to the diameter of said measuring chamber to form an effective seal when said piston is axially moved into engagement with surfaces of said measuring chamber.

7. The device of claim 5 wherein said piston has a tapered first end with an annular lip portion of greater outer diameter than inner diameter of said measuring chamber thereby forming sealing means for said vessel measuring chamber.

8. The device of claim 7 wherein said adjustable member contains means for adjusting the position of said piston within said measuring chamber between a minimum and maximum position thereby allowing for a variable amount of said flowable material to be accepted within said measuring chamber.

9. The device of claim 8 wherein said housing has a cavity formed therein for accepting a predetermined minimum volume of said flowable material when said piston is fully positioned within said measuring chamber.

10. The device of claim 9 wherein said housing includes means for controlling movement of said vessel, said means including a spring mounted in said housing for biasing said vessel to said first position whereby said device is in a fillable position, said spring being adapted for exterior manipulation for registering said vessel to said second position whereby said device is in a discharge position.

11. The device of claim 10 further including detent means to detain said vessel in said second dispensing position, said detent means comprising detents formed in opposite longitudinally extending interior walls of said vessel engageable with a portion of interior walls of said housing.

12. The device of claim 11 wherein said movement of said vessel is translational, translational slidable movement of said vessel being guided by a plurality of parallel extending tracks formed within said housing on opposite sides of said spring and an interconnecting series of projections formed in said vessel for movement within said tracks.

13. The device of claim 12 having a cross section of size and shape suitable for grasping in one hand, and whereby operation of said hand held device is accomplished by grasping said apparatus in one hand with a thumb or finger about said vessel, and with remaining fingers on the opposite side of said device, squeezing the device with hand so to force translational movement of said vessel inward toward the axis of said device thereby moving said second passageway in direct registry with measuring chamber, then inverting said device with a twist of a wrist thereby emptying the measured contents of said measuring chamber.

14. The device of claim 11 wherein movement of said vessel between said first end and second positions is rotational, said vessel being pivotally mounted on said housing to deposit flowable material within said measuring chamber and alternately to dispense flowable material.

* * * * *

UNITED STATES PATENT AND TRADEMARK OFFICE
CERTIFICATE OF CORRECTION

PATENT NO. : 4,579,256
DATED : April 1, 1986
INVENTOR(S) : Philip Heimlich

It is certified that error appears in the above—identified patent and that said Letters Patent is hereby corrected as shown below:

Column 2, line 37, wherein the word wherein the word ";and" should read --;--.

Column 4, line 29, wherein the word "portion portion" should read --portion--.

Signed and Sealed this

Twenty-ninth Day of July 1986

[SEAL]

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : B1 4,579,256
DATED : November 3, 1987
INVENTOR(S) : Philip F. Heimlich It is certified that error appears in the above—identified patent and that said Letters Patent is hereby corrected as shown below:

Column 2, line 24, wherein the words "fillable into" should be --receivable in--.

Signed and Sealed this

Twentieth Day of September, 1988

Attest:

DONALD J. QUIGG

*Attesting Officer*          *Commissioner of Patents and Trademarks*

REEXAMINATION CERTIFICATE (779th)
United States Patent [19]
Heimlich

[11] B1 4,579,256
[45] Certificate Issued Nov. 3, 1987

[54] FLOWABLE MATERIAL DISPENSER

[75] Inventor: Philip F. Heimlich, South Windsor, Conn.

[73] Assignee: Himedic Inc., Fla.

Reexamination Request:
No. 90/001,144, Dec. 29, 1986

Reexamination Certificate for:
Patent No.: 4,579,256
Issued: Apr. 1, 1986
Appl. No.: 668,735
Filed: Nov. 6, 1984

Certificate of Correction issued Jul. 29, 1986.

[51] Int. Cl.⁴ ............................................. B67D 5/64
[52] U.S. Cl. .................................... 222/162; 222/166

[56] References Cited
U.S. PATENT DOCUMENTS
1,959,276  5/1934  Paardecamp ...................... 222/440

FOREIGN PATENT DOCUMENTS
0001411  4/1979  European Pat. Off. .
2298091  8/1976  France .
907543  10/1962  United Kingdom .

*Primary Examiner*—Joseph J. Rolla

[57] ABSTRACT

A hand held and operated apparatus is provided for adjustably measuring and dispensing a flowable material. A vessel for containing the flowable material is positioned on a housing for movement between a first measuring position and second discharge position. An adjustable member is rotatably positioned with the housing and opposite the vessel for variably adjusting the quantity of material to be dispensed.

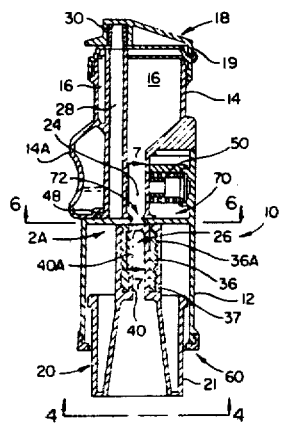

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 8 and 12–14 are cancelled.

Claims 1–3 and 5 are determined to be patentable as amended.

Claims 4, 6, 7 and 9–11, dependent on an amended claim, are determined to be patentable.

New claims 15 and 16 are added and determined to be patentable.

1. A hand held and operable device for measuring and dispensing a flowable material comprising:
    (a) a housing having a measuring chamber for accepting and measuring a quantity of said flowable material, *said measuring chamber having an opening therein for passage of said flowable material into and out of said measuring chamber*; and
    (b) a vessel having a reservoir for containing said flowable material supported on said housing for *translational* movement *relative to said housing* between a first measuring position and second discharging position, said vessel communicating with said measuring chamber through two passageways, a first measuring passageway in axial alignment with said measuring chamber *opening* when said vessel is in said first measuring position allowing said flowable material to flow into said measuring chamber and a second [dispensing] *discharge* passageway having one end spaced from and coplanar with said first measuring passageway movable into registry with said measuring chamber *opening*, said second dispensing passageway having an opposite end forming a discharge opening whereby *translational* movement of said vessel from first passageway registry with *said* measuring chamber *opening*, to second discharge passageway registry with *said* measuring chamber *opening*, and upon inversion of said device, the material in said measuring chamber will flow through said second [dispensing] *discharge* passageway delivering said flowable material.

2. The device of claim 1 wherein said measuring chamber contains a metering member which is adjustably positioned within said measuring chamber *for movement toward and away from said measuring chamber opening* to vary the quantity of said flowable material receivable in said measuring chamber.

3. The device of claim 1 further comprising an adjustable member accessible from *the* exterior of said housing rotatably positioned within said housing and being opposite said vessel, said adjustable member having a metering member movably disposed within said measuring chamber *for movement toward and away from said measuring chamber opening* to vary the volume of said flowable material fillable into said measuring chamber.

5. The device of claim 4 wherein said measuring chamber is of a cylindrical cross sectional configuration and said metering member is a piston *mounted* for movement within said measuring chamber *toward and away from said measuring chamber opening*.

*15. The device of claim 11 wherein said translational movement of said vessel is guided by a plurality of parallel extending tracks formed within said housing on opposite sides of said spring and an interconnecting series of projections formed in said vessel for movement within said tracks.*

*16. The device of claim 15 having a cross section of size and shape suitable for grasping in one hand, and whereby operation of said hand held device is accomplished by grasping said apparatus in one hand with a thumb or finger about said vessel, and with remaining fingers on the opposite side of said device, squeezing the device with said hand so as to force translational movement of said vessel inward toward the axis of said device thereby moving said second passageway in direct registry with said measuring chamber, then inverting said device with a twist of a wrist thereby emptying the measured contents of said measuring chamber.*

* * * * *